United States Patent
Steiner et al.

(10) Patent No.: US 9,156,026 B2
(45) Date of Patent: Oct. 13, 2015

(54) IRON-COMPRISING HETEROGENEOUS CATALYST AND PROCESS FOR PREPARING OLEFINS BY REACTION OF CARBON MONOXIDE WITH HYDROGEN

(71) Applicant: BASF SE, Ludwigshafen (DE)

(72) Inventors: Jochen Steiner, Bensheim (DE); Kerem Bay, Ludwigshafen (DE); Ekkehard Schwab, Neustadt (DE); Ralf Böhling, Lorsch (DE)

(73) Assignee: BASF SE, Ludwigshafen (DE)

( * ) Notice: Subject to any disclaimer, the term of this patent is extended or adjusted under 35 U.S.C. 154(b) by 405 days.

(21) Appl. No.: 13/782,353

(22) Filed: Mar. 1, 2013

(65) Prior Publication Data

US 2013/0245138 A1  Sep. 19, 2013

Related U.S. Application Data

(62) Division of application No. 12/939,903, filed on Nov. 4, 2010, now Pat. No. 8,410,018.

(30) Foreign Application Priority Data

Nov. 6, 2009 (EP) .................................. 09175218

(51) Int. Cl.
| | | |
|---|---|---|
| *C07C 27/00* | (2006.01) | |
| *B01J 37/18* | (2006.01) | |
| *B01J 35/02* | (2006.01) | |

(Continued)

(52) U.S. Cl.
CPC ................ *B01J 27/20* (2013.01); *B01J 23/745* (2013.01); *B01J 23/78* (2013.01); *B01J 35/023* (2013.01); *B01J 37/0201* (2013.01); (Continued)

(58) Field of Classification Search
CPC ............ C07C 2523/745; C07C 1/0485; C07C 1/0445; C10G 2/332; B01J 23/745; B01J 27/20
See application file for complete search history.

(56) References Cited

U.S. PATENT DOCUMENTS

| 2,417,164 A | 3/1947 | Huber, Jr. |
| 4,544,674 A | 10/1985 | Fiato et al. |

(Continued)

FOREIGN PATENT DOCUMENTS

| DE | 528463 C | 6/1931 |
| DE | 763688 | 11/1953 |

(Continued)

OTHER PUBLICATIONS

DIN 66 133—Jun. 1993.

(Continued)

*Primary Examiner* — Bijay Saha
(74) *Attorney, Agent, or Firm* — Drinker Biddle & Reath LLP (57) ABSTRACT

A process for preparing olefins by reaction of carbon monoxide with hydrogen in the presence of a an iron-comprising heterogeneous catalyst produced by the following steps: thermal decomposition of gaseous iron pentacarbonyl to give carbonyl iron powder having spherical primary particles; treatment of carbonyl iron powder with hydrogen, resulting in the metallic spherical primary particles at least partially forming agglomerates; contacting the agglomerates with iron pentacarbonyl; and thermal decomposition of the iron pentacarbonyl to give at least predominantly pore-free and void-free secondary particles.

7 Claims, 7 Drawing Sheets

(51) Int. Cl.
 *B01J 37/08* (2006.01)
 *C10G 2/00* (2006.01)
 *B01J 27/20* (2006.01)
 *B01J 37/02* (2006.01)
 *B01J 23/78* (2006.01)
 *B01J 23/745* (2006.01)

(52) U.S. Cl.
 CPC ............... *B01J 37/086* (2013.01); *B01J 37/18* (2013.01); *C10G 2/332* (2013.01); *C10G 2400/20* (2013.01)

(56) References Cited

U.S. PATENT DOCUMENTS

| | | | |
|---|---|---|---|
| 5,100,856 | A | 3/1992 | Soled et al. |
| 5,118,715 | A | 6/1992 | Iglesia et al. |
| 5,248,701 | A | 9/1993 | Soled et al. |
| 2004/0127582 | A1 | 7/2004 | Kiss et al. |
| 2009/0005464 | A1 | 1/2009 | Hoffer et al. |

FOREIGN PATENT DOCUMENTS

| | | |
|---|---|---|
| DE | 2507647 A1 | 9/1976 |
| DE | 2822656 A1 | 12/1978 |
| DE | 2919921 A1 | 11/1980 |
| EP | 1 640 856 | 3/2006 |
| GB | 2050859 A | 1/1981 |
| WO | WO-2007/060186 A1 | 5/2007 |
| WO | WO-2009/013174 A2 | 1/2009 |
| WO | WO 2009/071463 | 6/2009 |
| WO | PCT/EP/2009/061343 | 3/2010 |
| WO | WO 2011/054734 | 3/2011 |
| WO | WO 2011/054735 | 3/2011 |
| WO | WO 2011/054738 | 3/2011 |

OTHER PUBLICATIONS

DIN ISO 9277—May 2003.
"Fachberichte fUr Oberflachentechnik", Jul./Aug. 1970, pp. 145 to 150.
H.G.F. Wilsdorf et al., Z. Metallkde. 69 (11), 1978, paQes 701 to 705.
Amara D et al: "Synthesis and characterization of Fe and Fe 304 nanoparticles by thermal decomposition of triion dodecacarbonyl", Colloids and surfaces, A. Physicachemical and engineering aspects, pp. 106-110, Elsevier, Amsterdam, NL, 2009.
K.Y. Park et al: "In situ deposition of iron nanoparticles on transmission electron microscopy grid in furnace aerosol reactor", pp. 2285-2287, J. Mater, Res., 2003.
U.S. Appl. No. 12/939,281, filed Nov. 4, 2010, Steiner et al.
U.S. Appl. No. 12/940,772, filed Nov. 5, 2010, Steiner et al.
U.S. Appl. No. 12/950,646, filed Nov. 19, 2010, Steiner et al.
U.S. Appl. No. 13/063,321, filed Mar. 10, 2011, Steiner et al.

Agglomerated CIP

Figure 5

Agglomerated CIP with depiction of the pore structure

General:
Pore volume measurement and determination of the pore diameter in accordance with DIN 66133.

CIP filled by treatment according to the invention with IPC with depiction of the pore structure

IRON-COMPRISING HETEROGENEOUS CATALYST AND PROCESS FOR PREPARING OLEFINS BY REACTION OF CARBON MONOXIDE WITH HYDROGEN

CROSS-REFERENCE TO RELATED APPLICATIONS

This application is a divisional application of U.S. application Ser. No. 12/939,903, filed Nov. 4, 2010, now Pat. No. 8,410,018, which claims benefit of European Application No. 09175218.8, filed Nov. 6, 2009. The contents of both are incorporated herein by reference in their entirety.

FIELD OF THE INVENTION

The present invention relates to an iron-comprising heterogeneous catalyst, a process for producing it and a process for preparing olefins by reaction of carbon monoxide with hydrogen in the presence of the iron-comprising heterogeneous catalyst.

BACKGROUND OF THE INVENTION

It is known that lower olefins can be prepared from carbon monoxide (CO) and hydrogen ($H_2$) over metal catalysts, e.g. iron or cobalt catalysts. Iron oxides are usually used as catalyst precursors. Such catalysts are described, for example, in U.S. Pat. Nos. 4,544,674, 5,100,856, 5,118,715, 5,248,701, US 2004/0127582 A1, H. P. Withers et al., Ind. Eng. Chem. Res. 1990, 29, pages 1807 to 1814, and M. E. Dry et al., Stud. Surf. Sci. Catal., Vol. 152, 2004, pages 533 to 600.

This reaction is also referred to as the Fischer-Tropsch synthesis.

Conventional processes for the Fischer-Tropsch synthesis produce hydrocarbons in a wide range of product distribution.

This range of product distribution can basically be characterized by the Anderson-Schulz-Flory distribution; cf. also: M. Janardanarao, Ind. Eng. Chem. Res. 1990, 29, pages 1735-53.

It is likewise known that the composition of the hydrocarbons formed in the Fischer-Tropsch process can be strongly influenced by the choice of the catalysts used, the reactor types and the reaction conditions.

For example, it is known that the product distribution can be shifted in the direction of lower olefins by use of high temperatures in the presence of modified iron catalysts: B. Büssemeier et al., Hydrocarbon Processing, November 1976, pages 105 to 112.

The main problem here is the formation of large amounts of undesirable methane ($CH_4$).

In addition, the iron oxides required as starting material for the catalyst are difficult to reduce.

DE 28 22 656 A1 (Inst. Fr. du Petrole) discloses a Fischer-Tropsch process in which the catalyst is obtained by deposition of a metal-organic iron and/or cobalt and/or nickel aggregate onto an inorganic support. The deposition of the aggregate on the support is effected by impregnating the support with a solution of the aggregate. This process is said to form C2-C4-olefins ("lower olefins") selectively and only small amounts of methane are said to be formed. The main disadvantage of these catalysts is that the active catalyst constituents can be volatile under the reaction conditions, which means a loss of metal, and that they are toxic.

DE 29 19 921 A1 (Vielstich et al.) describes a further Fischer-Tropsch process in which catalysts comprising polycrystalline iron whiskers as substantial catalyst component are used. These iron whiskers are obtained by thermal decomposition of iron pentacarbonyl in a magnetic field. The iron whiskers are preferably used as pellets. According to the teaching of this DE document, polycrystalline whiskers are fine iron threads having microscopically small single crystal regions (page 5, 3rd paragraph). The thread-like primary particles gain their shape from growth in a magnetic field. The threads have a length of, for example, from 0.06 to 1 mm.

The two pictures in "Fachberichte für Oberflächentechnik", July/August 1970, page 146, show scanning electron micrographs of such a carbonyl iron powder having thread-like primary particles.

"Fachberichte für Oberflächentechnik", July/August 1970, pages 145 to 150, also describes these iron whiskers as metal hairs which result from crystal growth of the metal in thread form, unlike normal crystal growth (page 145, 2nd paragraph). In the polycrystalline iron whiskers, the ratio of length to diameter is, for example, $\geq 10$.

Such polycrystalline iron whiskers are also described in H. G. F. Wilsdorf et al., Z. Metallkde. 69 (11), 1978, pages 701 to 705.

DE 25 07 647 A1 (Kölbel et al.) describes the use of catalysts comprising manganese and optionally iron for preparing hydrocarbons and oxygen-comprising compounds from CO and $H_2$.

U.S. Pat. No. 2,417,164 (Standard Oil Comp.) relates to processes for synthesizing liquid hydrocarbons from CO and $H_2$ in the presence of metal catalysts, including carbonyl iron powder.

WO 07/060,186 A1 (BASF AG) teaches processes for preparing olefins from synthesis gas using Fischer-Tropsch catalysts in a reaction column.

WO 09/013,174 A2 (BASF SE) relates to a process for preparing short-chain, gaseous olefins by reaction of carbon monoxide with hydrogen in the presence of an iron-comprising heterogeneous catalyst, with carbonyl iron powder having spherical primary particles being used as catalyst.

The EP application No. 08164085.6 (BASF SE) of Sep. 10, 2008 describes an integrated process in which pure carbonyl iron powder (CIP) is prepared by decomposition of pure iron pentacarbonyl (IPC) in a plant A, carbon monoxide (CO) liberated in the decomposition of the IPC is used for preparing further CIP from iron in plant A or is fed to an associated plant B for producing synthesis gas or is fed to an associated plant C for preparing hydrocarbons from synthesis gas, and the CIP prepared in plant A is used as catalyst or catalyst component in an associated plant C for preparing hydrocarbons from synthesis gas from plant B.

Two parallel European patent applications having the same filing date (all BASF SE) relate to particular iron-comprising heterogeneous catalysts and their use in processes for preparing olefins by reaction of carbon monoxide with hydrogen.

BRIEF SUMMARY OF THE INVENTION

It was an object of the present invention to circumvent disadvantages of the prior art and discover an improved catalyst and an improved economical process for preparing olefins. The process should, in particular, give lower olefins (e.g. C2-C6-olefins, in particular C2-C4-olefins), in particular ethene, propene and 1-butene, very selectively with at the same time very low formation of methane, carbon dioxide, alkanes (e.g. C2-C6-alkanes, in particular C2-C4-alkanes) and higher hydrocarbons, i.e. hydrocarbons having, for example, seven or more carbon atoms (C7+ fraction), in particular five or more carbon atoms (C5+ fraction). Constituents of the catalyst should not be volatile under the reaction conditions.

The catalyst should display an improved operating life and increased mechanical stability. The increased stability is particularly advantageous when the catalyst is used in a fluidized bed or in slurry reactors or else in bubble columns.

According to the invention, the following aspects, inter alia, have been recognized:

The metallic secondary particles formed in step II with at least partial agglomeration, particularly in a fluidizable fraction having particle diameters in the range from 10 to 250 μm (see below), are, owing to their chemical composition, ideal catalyst precursors for the synthesis of lower olefins from CO-rich synthesis gases. An additional advantage is the low surface area of the particles, which is preferably below 2 m$^2$/g (see below).

A particular advantage is the low oxygen content of the metallic secondary particles, as a result of which a reduction, and thus activation of the catalyst, is greatly simplified.

Figure 5:
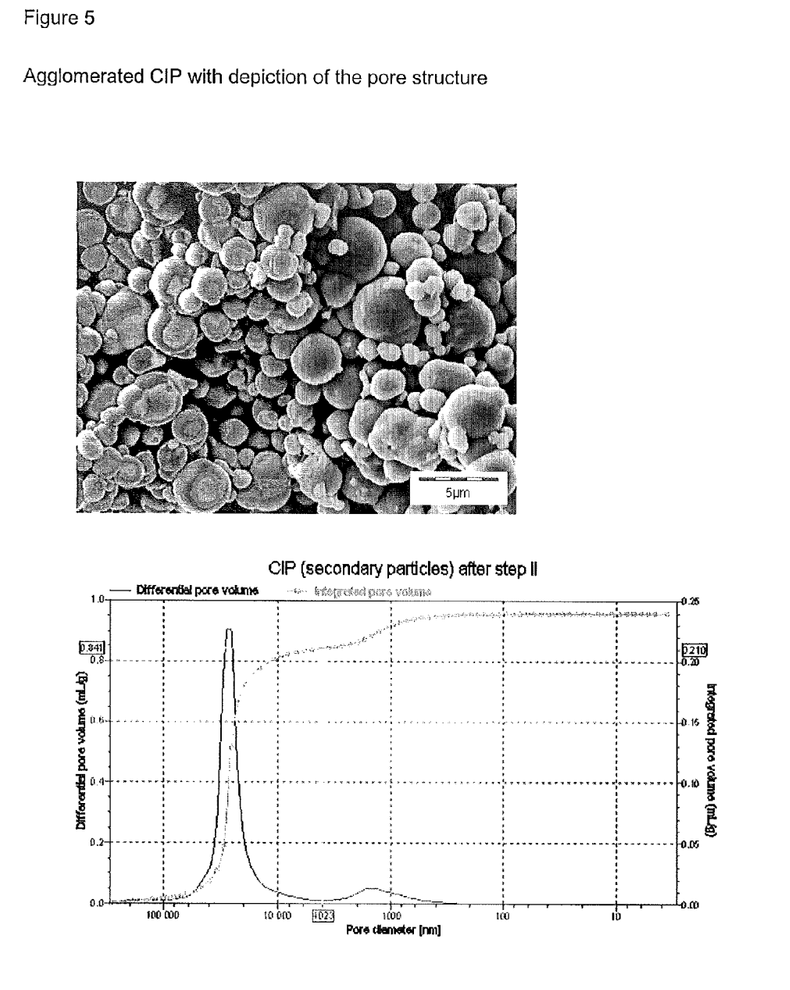
Figure 7:
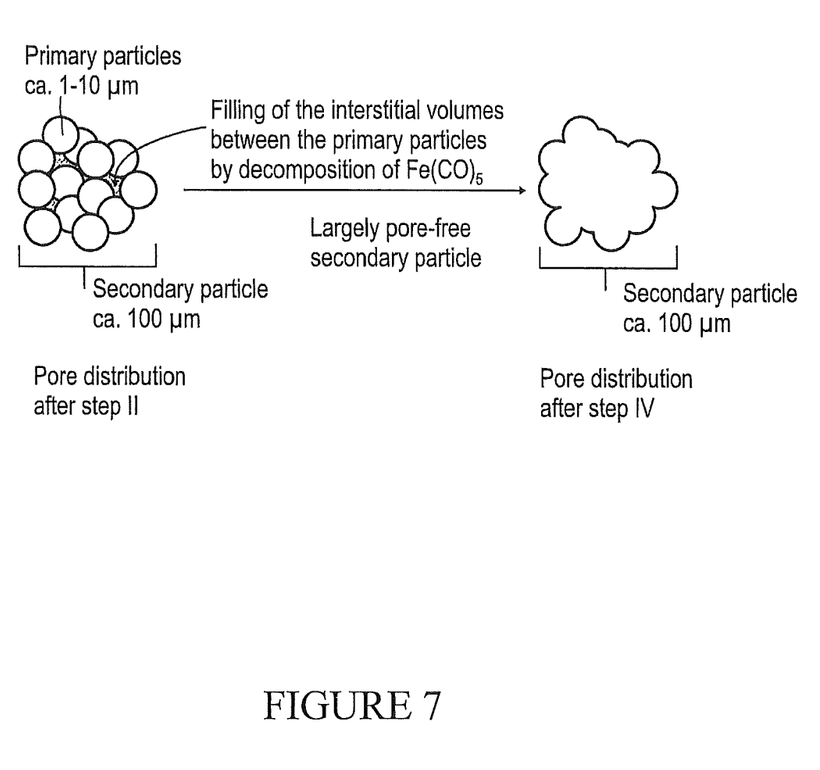
FIG. 7 shows the pore distribution after step II and after step IV.

Owing to the method of production, the secondary particles comprise interstitial pores (intraparticulate pores=pores between the spherical primary particles; see FIGS. 5 and 7) which display disadvantageous physical properties under the synthesis conditions for the lower hydrocarbons (HCs):

1) carbon deposits can be formed in the pores and lead to mechanical rupture of the particles (adverse for operating life, discharge of fines from fluidized bed)
2) the pores promote the formation of undesirable long-chain HCs
3) the pores promote the hydrogenation of olefins The agglomerates (=secondary particles) are, according to the invention, brought into contact with Fe(CO)$_5$ in a step following the above-described reduction and the pores are filled with Fe(CO)$_5$, in particular by condensation/flooding. Subsequent thermal decomposition of the IPC leads to at least predominantly pore- and void-free secondary particles which no longer have the adverse properties indicated in points 1-3 above and thus significantly increase the absolute yield of olefins and also the catalyst operating life (chemical and mechanical aspects, see FIGS. 6 and 7). In addition, the filling of the pores increases the mechanical stability of the secondary particles.

We have accordingly found an iron-comprising heterogeneous catalyst and a process for producing it, which comprises the following steps:

I. thermal decomposition of gaseous iron pentacarbonyl to give carbonyl iron powder having spherical primary particles,
II. treatment of carbonyl iron powder obtained in step I with hydrogen, resulting in the metallic spherical primary particles at least partially agglomerating,
III. contacting of the agglomerates (=secondary particles) with iron pentacarbonyl,
IV. thermal decomposition of the iron pentacarbonyl applied in step III to give at least predominantly pore- and void-free secondary particles.

Furthermore, we have accordingly found a process for preparing olefins by reaction of carbon monoxide with hydrogen in the presence of a catalyst, wherein the abovementioned iron-comprising heterogeneous catalyst is used as catalyst.

The proportion of spherical primary particles comprised in the carbonyl iron powder obtained in step I is preferably >90% by weight, in particular >95% by weight, very particularly preferably >98% by weight.

The spherical primary particles obtained in step I preferably have a diameter in the range from 0.01 to 50 μm, in particular in the range from 0.1 to 20 μm, very particularly preferably in the range from 0.5 to 15 μm, more particularly in the range from 0.7 to 10 μm, more particularly in the range from 1 to 10 μm.

The iron content of the spherical primary particles is preferably >97% by weight, particularly preferably ≥99% by weight, in particular ≥99.5% by weight.

The iron is preferably present in its most thermodynamically stable modification (alpha-iron).

The spherical primary particles are preferably free of pores.

The carbonyl iron powder has, in particular, no thread-like primary particles in addition to the spherical primary particles, in particular not the iron whiskers disclosed in DE 29 19 921 A1 and "Fachberichte für Oberflächentechnik", July/August 1970, pages 145 to 150 (see above).

Figure 1:
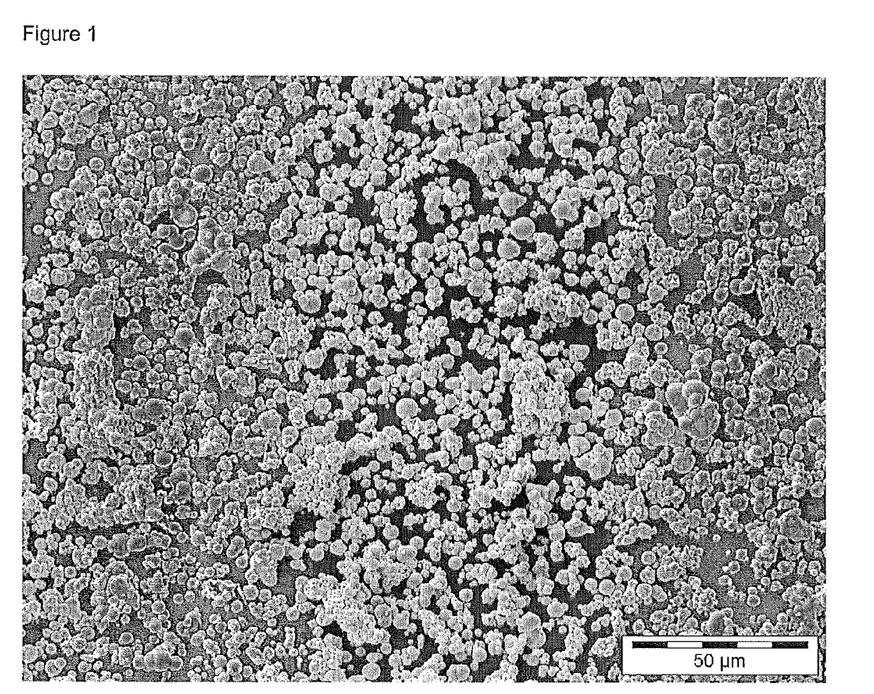
FIGS. 1-3 show scanning electron micrographs of preferred carbonyl iron powder having spherical primary particles before the hydrogen treatment according to step II in the disclosure.
Figure 2:
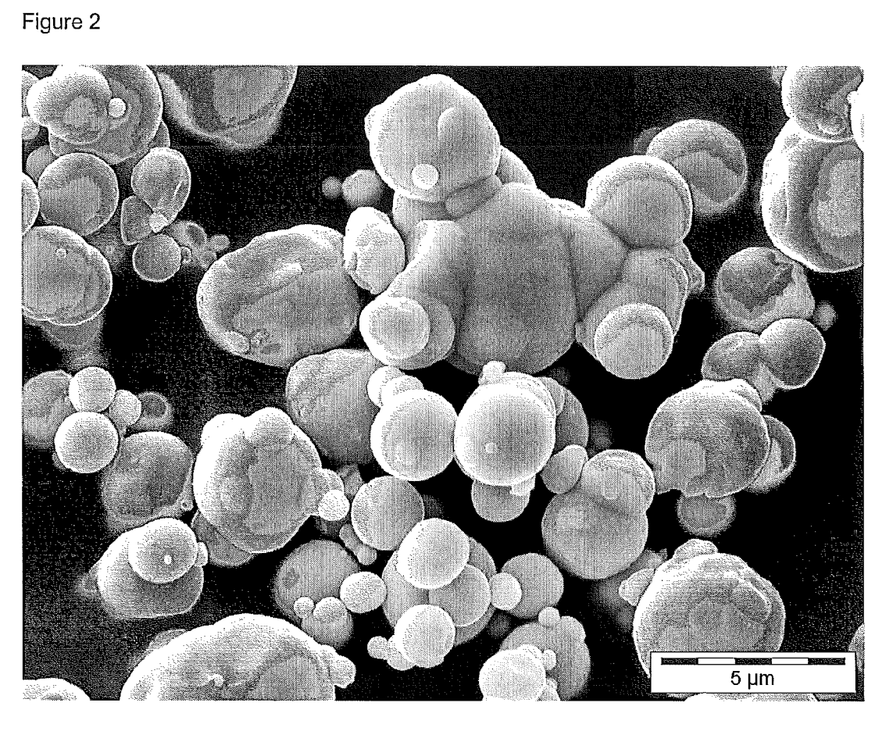
Figure 3:
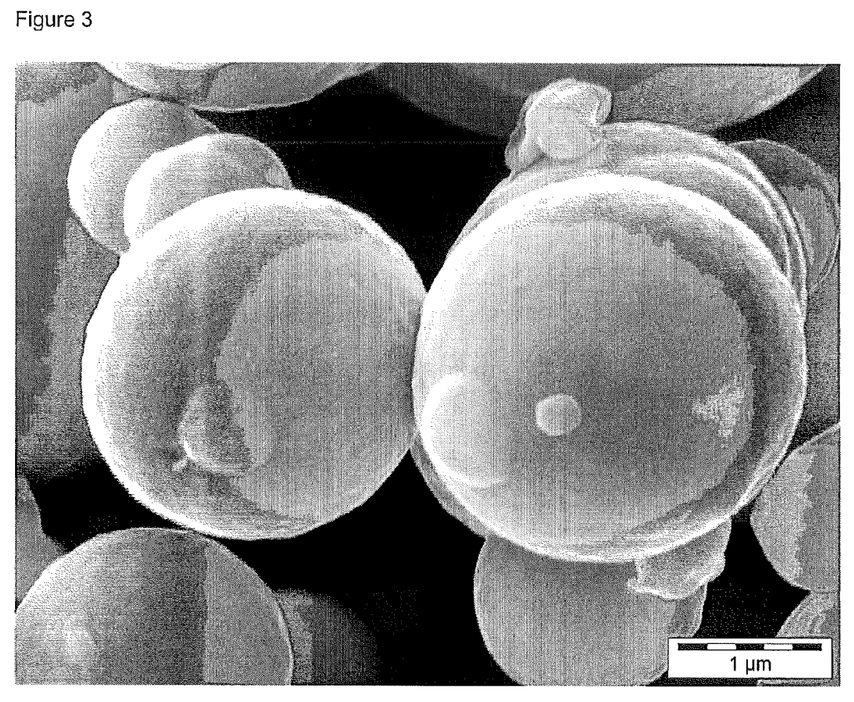

FIGS. 1 to 3 show scanning electron micrographs of preferred carbonyl iron powder having spherical primary particles before the hydrogen treatment in step II.

Carbonyl iron powder having spherical primary particles which can be used in the process of the invention can be obtained, for example, under the name "Carbonyleisenpulver CN" from BASF AG or now BASF SE, D-67056 Ludwigshafen.

The carbonyl iron powder having spherical primary particles is obtained by thermal decomposition of gaseous iron pentacarbonyl (Fe[CO]$_5$), which has preferably been purified beforehand by distillation.

The product obtained in step I is treated with hydrogen in step II. This treatment of the primary particles with hydrogen is preferably carried out at a temperature in the range from 300 to 600° C. This treatment reduces the residual content of carbon, nitrogen and also oxygen in the CIP. (DE 528 463 C1, 1927). Here, the spherical primary particles are at least partially agglomerated, e.g. to an extent of from 25 to 95% by weight.

The metallic secondary particles formed by at least partial agglomeration in step II preferably have particle diameters in the range from 10 to 250 μm, particularly preferably from 50 to 150 μm. Such fluidizable particle fractions can be obtained by appropriate sieving.

In step II, metallic secondary particles having BET surface areas (DIN ISO 9277) of preferably less than 2 m$^2$/g, in particular from 0.2 to 1.9 m$^2$/g, are formed.

Figure 4:
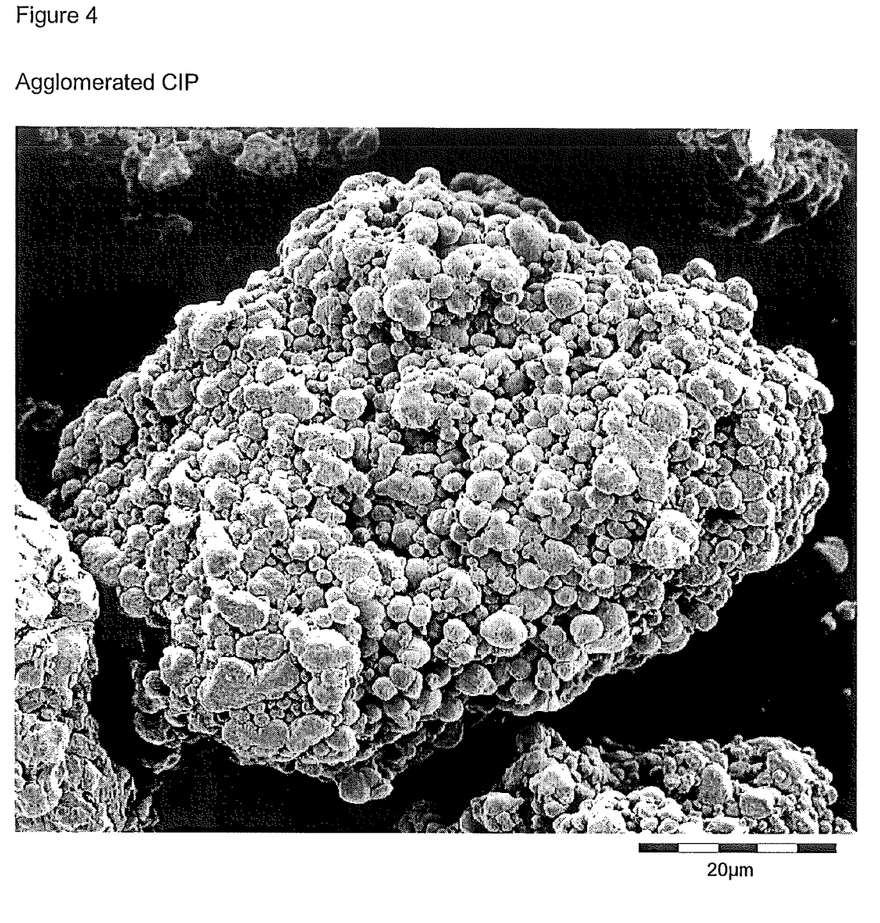
FIGS. 4-5 show, by way of example, agglomerates obtained after the hydrogen treatment.

FIGS. 4 and 5 show, by way of example, agglomerates obtained after the hydrogen treatment.

In step III, the agglomerates are preferably brought into contact with liquid or gaseous iron pentacarbonyl. Particular preference is given to liquid iron pentacarbonyl.

For this purpose, the metallic secondary particles are, for example, introduced into an argon-blanketed vessel and dried at elevated temperature, e.g. from 70 to 150° C., in particular, for example, at an internal temperature in the vessel of 105° C.

Iron pentacarbonyl is then introduced in liquid form a little at a time (e.g. 5% by volume based on the amount of carbonyl iron powder), e.g. through an inlet tube.

The alternative contacting with gaseous iron pentacarbonyl can, for example, be carried out in a fluidized bed, in particular at a temperature in the range from 120 to 175° C. It is preferably carried out at an IPC partial pressure (absolute) in the range from 0.7 to 1 bar.

The thermal decomposition of iron pentacarbonyl in step IV is preferably carried out at a temperature in the range from 150 to 350° C., in particular in the range from 150 to 200° C.

For example, the vessel in which the material from step III is present is heated to an internal temperature in the range of preferably from 150 to 180° C. and the decomposition reaction of the applied IPC is preferably monitored by means of an IR spectrometer. When the CO content of the offgas has passed its maximum, the vessel is cooled back down to, for example, 105° C.

Depending on the desired degree of fill of the pores, the procedure of the two steps III and IV is repeated.

Predominantly pore- and void-free secondary particles are obtained in step IV. The secondary particles obtained in step II have interstitial pores between the spherical primary particles (pore diameter, in particular, <4000 nm). The interstitial pores, in particular the interstitial pores having diameters of <4000 nm, thus represent the above-described intraparticulate pores (FIGS. 5 and 7) while the measured pores having diameters of, in particular, >4000 nm can be interpreted as interparticulate pores (resulting from the interstitial volume of the secondary particles).

The treatment according to the invention of the secondary particles with iron pentacarbonyl makes it possible to fill the interstitial pores between the spherical primary particles, in particular those having diameters in the range <4000 nm. This therefore gives predominantly pore- and void-free secondary particles in which, in particular, the differential pore volume associated with pore diameters in the range <4000 nm contributes <10%, in a particular embodiment <5%, to the measured integrated pore volume of the secondary particles.

The amount of iron pentacarbonyl necessary for filling the pores having a diameter of, in particular, <4000 nm is preferably determined by means of pore volume measurement by means of mercury porosimetry (DIN 66133).

Figure 6:
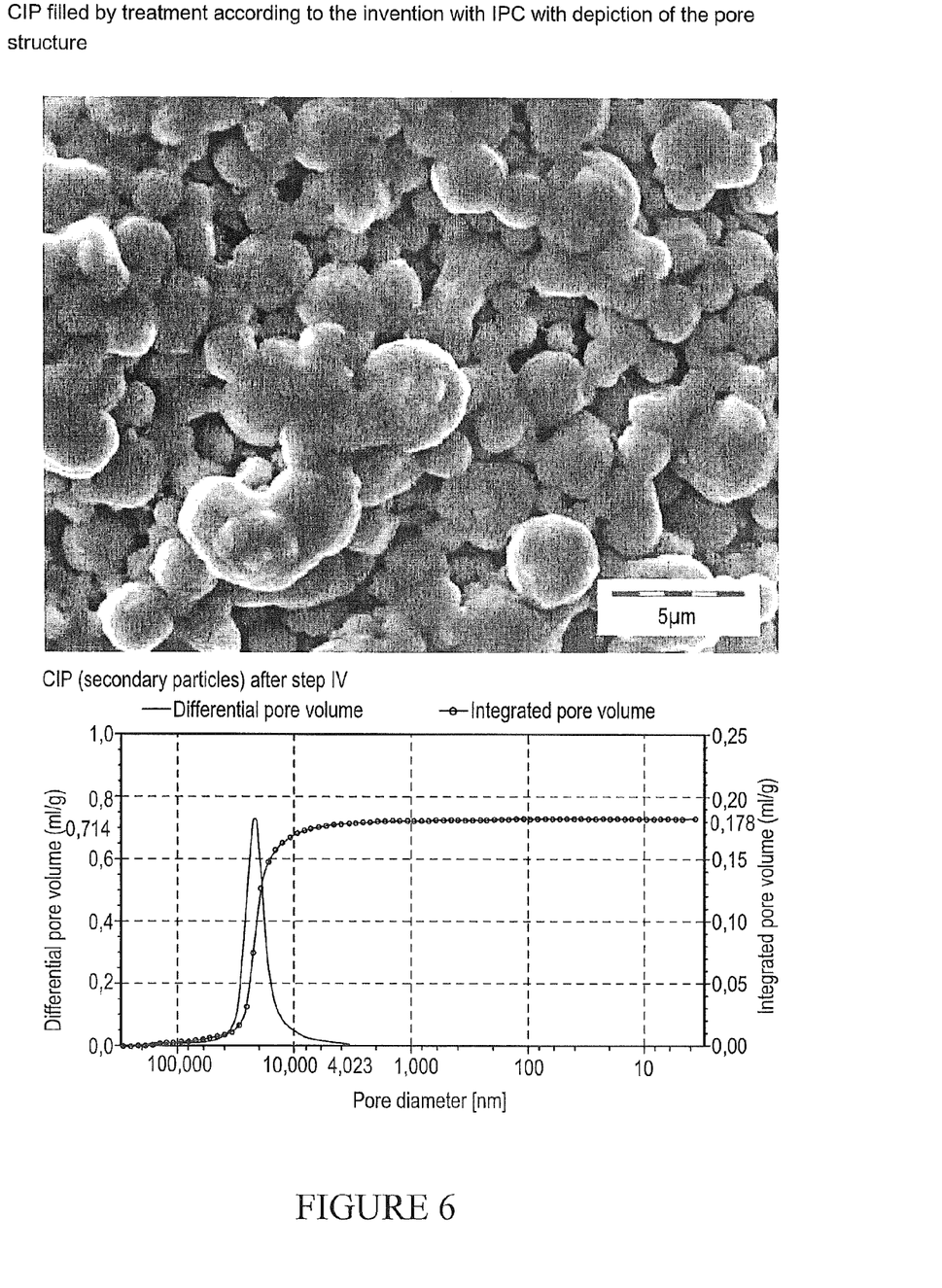
FIG. 6 shows a carbonyl iron powder obtained in steps IV in the disclosure.

Particles obtained in step IV are shown, by way of example, in FIG. 6.

Even without any additives, the iron-comprising heterogeneous catalyst of the invention displays an advantageous catalytic activity.

In a particular embodiment, an additional step V in which the particles from step IV are doped with a promoter or a plurality of promoters to increase the catalytic activity is carried out in the production of the catalyst.

Promotors in iron catalysts for Fischer-Tropsch syntheses are described, for example, in M. Janardanarao, Ind. Eng. Chem. Res. 1990, 29, pages 1735 to 1753, or C. D. Frohning et al. in "Chemierohstoffe aus Kohle", 1977, pages 219 to 299.

As suitable promoters, the catalyst can comprise, for example, one or more of the elements potassium, vanadium, copper, nickel, cobalt, manganese, chromium, zinc, silver, gold, calcium, sodium, lithium, cesium, platinum, palladium, ruthenium, sulfur, in each case in elemental form (oxidation state=0) or in ionic form (oxidation state≠0).

The total doping (i.e. sum of all promoters, if there are a plurality of promoters) is preferably in the range from 0.01 to 30% by weight, particularly preferably from 0.01 to 20% by weight, very particularly preferably from 0.1 to 15% by weight, e.g. from 0.2 to 10% by weight, in particular from 0.3 to 8% by weight (in each case calculated as element in the oxidation state 0 and in each case based on iron).

In a particular embodiment of the process of the invention, doping with potassium ions and/or sodium ions as promoter is carried out in step V.

In a further particular embodiment of the process of the invention, doping with manganese and/or copper, in each case in elemental form or in ionic form, is carried out in step V, especially in addition to doping with potassium ions and/or sodium ions.

Particular preference is given to carrying out doping with a total in the range from 0.01 to 10% by weight, preferably from 0.1 to 5% by weight, of potassium ions and/or sodium ions (in each case calculated as element in the oxidation state 0 and in each case based on iron) in step V.

Particular preference is given to carrying out doping with a total in the range from 0.01 to 10% by weight, preferably from 0.1 to 5% by weight, of manganese and/or copper (in each case calculated as element in the oxidation state 0 and in each case based on iron) in step V.

The application of the promoters mentioned can, in particular, be effected by impregnating the particles with aqueous salt solutions of the metals mentioned, preferably carbonates, acetates, chlorides, nitrates or oxides.

In a particular embodiment, compounds which reduce the surface tension of the impregnation solution, e.g. surfactants, can be added to the aqueous salt solutions.

Furthermore, the elements acting as promoter can be applied by thermal decomposition of the corresponding gaseous carbonyl compounds, e.g. chromium, cobalt, manganese or nickel carbonyls.

The catalyst of the invention is particularly preferably not applied to a support material.

In the process of the invention, the doped or undoped, iron-comprising heterogeneous catalyst can be used in the form of pellets.

The pellets are obtained by methods known to those skilled in the art. Preferred shapes of the pellets are tablets and rings.

The pellets can also be comminuted again, e.g. by milling, before being used in the process of the invention.

The catalyst can be converted into a more synthesis-active state by treatment with hydrogen and/or carbon monoxide at elevated temperature, in particular at temperatures above 300° C., before being used in the process of the invention. However, this additional activation is not absolutely necessary.

In the process of the invention, the starting materials carbon monoxide and hydrogen are preferably used in the form of synthesis gas.

The synthesis gas can be produced by generally known methods (as described, for example, in Weissermel et al., Industrial Organic Chemistry, Wiley-VCH, Weinheim, 2003, pages 15 to 24), for example by reaction of coal or methane with hydrogen or by partial oxidation of methane. The synthesis gas preferably has a molar ratio of carbon monoxide to hydrogen in the range from 3:1 to 1:3. Particular preference is given to using a synthesis gas which has a molar mixing ratio of carbon monoxide to hydrogen in the range from 2:1 to 1:2.

In a particular embodiment of the process of the invention, the synthesis gas comprises carbon dioxide ($CO_2$). The $CO_2$ content is preferably in the range from 1 to 50% by weight.

The process of the invention is preferably carried out at a temperature in the range from 200 to 500° C., in particular from 300 to 400° C.

The absolute pressure is preferably in the range from 1 to 100 bar, in particular from 5 to 50 bar.

The WHSV (weight hourly space velocity) is preferably in the range from 50 to 10 000, particularly preferably from 150 to 5000, parts by volume of feed stream per unit mass of catalyst and hour (l/kg·h).

Preferred reactors for carrying out the process of the invention are: fluidized-bed reactor, fixed-bed reactor, suspension reactor, microreactor.

In a fluidized-bed reactor, microreactor and suspension reactor, the catalyst is preferably used in powder form.

The powder can also be obtained by milling previously formed pellets.

In a fixed-bed reactor, the catalyst is used as shaped bodies, preferably in the form of pellets.

The use of such reactors for the Fischer-Tropsch synthesis is described, for example, in C. D. Frohning et al. in "Chemierohstoffe aus Kohle", 1977, pages 219 to 299, or B. H. Davis, Topics in Catalysis, 2005, 32 (3-4), pages 143 to 168.

The process of the invention gives a product mixture comprising olefins with an olefin carbon selectivity, in particular an α-olefin carbon selectivity, for the C2-C4 range of preferably at least 20%, e.g. in the range from 20 to 30%. In the selectivity figures, carbon dioxide formed is not taken into account (i.e. excluding $CO_2$).

In a particular embodiment, a product mixture comprising olefins having an olefin carbon selectivity for the C2-C4 range of at least 20%, e.g. in the range from 20 to 30%, with at least 90% of this at least 20% in turn being made up by ethene, propene, 1-butene, is obtained. In the selectivity figures, carbon dioxide formed is not taken into account (i.e. excluding $CO_2$).

In a particularly preferred embodiment, a product mixture comprising olefins having an olefin carbon selectivity for the C2-C4 range of at least 25%, e.g. in the range from 25 to 30%, with at least 90% of this at least 25% in turn being made up by ethene, propene, 1-butene, is obtained. In the selectivity figures, carbon dioxide formed is not taken into account (i.e. excluding $CO_2$).

The olefins obtained are used, for example, in processes for preparing polyolefins, epoxides, oxo products, acrylonitriles, acrolein, styrene. See also: Weissermel et al., Industrial Organic Chemistry, Wiley-VCH, Weinheim, 2003, pages 145 to 192 and 267 to 312.

All pressures indicated are absolute pressures.

EXAMPLES

Catalyst Production

Example 1

According to the Invention

Filling of the Pores of Pure, Agglomerated Carbonyl Iron Powder (Secondary Particles) from Step II with Iron Pentacarbonyl as Per Step III and IV The amount of iron pentacarbonyl necessary for filling the pores having a diameter of, in particular, <4000 nm was determined by means of mercury porosimetry (DIN 66133).

200 ml of carbonyl iron material having a particle size distribution of the secondary particles such that 90% by weight have a diameter in the range from 50 to 100 μm, see FIG. 4, were produced from carbonyl iron powder grade CN, BASF AG or now BASF SE, by treatment with hydrogen at at least 300° C. The carbonyl iron material was dried at 105° C. for 5 hours under an argon atmosphere in a stirred vessel. 10 ml of iron pentacarbonyl were then introduced. The vessel was subsequently heated to an internal temperature of about 165° C. The decomposition was carried out at 165° C. with stirring of the particles. The reaction was complete when no iron pentacarbonyl and no free carbon monoxide were detected in the offgas stream. These steps were repeated 13 times. After the synthesis was complete, the product was flushed with argon at 100° C. for at least 12 hours until the CO and $Fe(CO)_5$ content in the offgas was <0.1 ppm by volume.

Example 2

According to the Invention

Production of K- and Cu-Doped, Filled Carbonyl Iron Catalyst by Impregnation of the Catalyst from Example 1

50 g of catalyst were produced as described in example 1 and impregnated with 5.5 ml of aqueous potassium/copper nitrate solution under ambient conditions (room temperature, atmospheric pressure). The aqueous potassium/copper nitrate solution was produced by dissolving 1.93 g of copper nitrate trihydrate (>99.5%, Merck) and 0.26 g of potassium nitrate (99%, Riedel de Haen) in 5.5 ml of demineralized water. The impregnated catalyst was dried at 120° C. for 4 hours. The catalyst obtained comprised 0.18% by weight of K and 0.88% by weight of Cu.

Example 3

Comparative Catalyst

Carbonyl iron material having a particle size distribution of the secondary particles such that 90% by weight have a diameter in the range from 50 to 100 μm, see FIG. 4, produced as described in example 1. This material was not after-treated with iron pentacarbonyl.

Performance of the catalysts according to the invention (examples 1, 2) and the comparative catalyst (example 3) in the process of the invention with prior identical activation Example 4

A series of comparative performance tests was carried out using, in each case, about 2.0 g of catalyst from one of examples 1, 2 and 3 and inert material dilution (catalyst: alpha-aluminum oxide=1:3 (weight ratio)). The catalysts were introduced into a fixed-bed reactor and started up directly using synthesis gas ($H_2$:CO=1:0.9 (molar)) at a rate of about 2.1 standard l/h at 25 bar in the reactor at 340° C. As internal standard for the on-line GC analysis, an additional 0.1 standard l/h of nitrogen gas was introduced. The results of the experiments carried out over a period of at least 100 h are shown below for the respective catalyst systems.

(standard l=standard liters=volume converted to STP),

| Catalyst | Example 1 | Example 2 | Example 3 |
|---|---|---|---|
| % max. CO conversion | 98 | 98 | 98 |
| Time to conversion of >95% [h] | 35 | 6 | 56 |
| % of carbon in $C_{7+}$ | 30 | 28 | 36 |
| % of carbon in carbon deposits, without $CO_2$ | 13 | 8 | 18 |

In the selectivity figures in the examples, carbon dioxide formed is not taken into account (i.e. without $CO_2$).

The measured values for example 4 shown in the table make it clear that the desired improvements compared to the comparative catalyst (example 3) are achieved by filling the pores <4000 nm in the secondary particles with iron pentacarbonyl (example 1). Thus, both the formation of long-chain hydrocarbons (C7+) and the formation of carbon deposits are significantly reduced.

In addition, the activity can be significantly increased by after-impregnation with K/Cu salts (catalyst from example 2).

Analysis of the Reaction Products:

The product streams were sampled via heated stream selectors and lines after condensing out the long-chain hydrocarbons in a hot separator (about 160° C., 25 bar) and fed to an on-line gas chromatograph (GC).

GC: Agilent 6890N with FID and thermal conductivity detector.

Precolumns: CP-Poraplot Q, length 12.5 m, ID 0.53 mm, film thickness 20 µm

FID:

Injector 250° C., split ratio 50:1, carrier gas helium, column Durabond DB-1 (length 60 m, ID 0.32 mm, film thickness 3 µm), detector 280° C.

Thermal Conductivity Detector:

Injector 200° C., split ratio 10:1, carrier gas argon, column Carboxen 1010 (length 30 m, ID 0.53 mm), detector 210° C.

Temperature program: 40° C.-5 min-7° C./min-250° C.-5 min, carrier gas: helium.

FIGS. 1 to 3:

Carbonyl iron powder (CIP) having spherical primary particles which can be used according to the invention in step II.

What is claimed is:

1. A process for preparing olefins by reaction of carbon monoxide with hydrogen in the presence of a catalyst, said process comprising utilizing an iron-comprising heterogeneous catalyst obtained by a process which comprises the following steps:
   I. thermal decomposition of gaseous iron pentacarbonyl to give carbonyl iron powder having spherical primary particles,
   II. treatment of carbonyl iron powder obtained in step I with hydrogen, resulting in the metallic spherical primary particles at least partially forming agglomerates,
   III. contacting agglomerates with iron pentacarbonyl, and
   IV. thermal decomposition of the iron pentacarbonyl applied in step III to give at least predominantly pore-free and void-free secondary particles.

2. The process of claim 1, wherein the reaction is carried out at a temperature in the range from 200 to 500° C.

3. The process of claim 1, wherein the reaction is carried out at an absolute pressure in the range from 1 to 100 bar.

4. A process for preparing C2-C4-olefins, said process comprising utilizing the process of claim 1.

5. The process of claim 1, wherein carbon monoxide and hydrogen are used in the form of synthesis gas for the reaction.

6. The process of claim 1, wherein carbon monoxide and hydrogen are used in a molar ratio in the range from 2:1 to 1:2.

7. The process of claim 5, wherein the synthesis gas comprises carbon dioxide ($CO_2$).

* * * * *